United States Patent [19]

Edwards et al.

[11] 4,020,035
[45] Apr. 26, 1977

[54] RESIN COMPOSITIONS

[75] Inventors: Alfred Gerald Edwards, Stourport on Severn; Glyn Islwyn Harris, Hagley, both of England

[73] Assignee: Albright & Wilson Limited, Midlands, England

[22] Filed: Sept. 16, 1974

[21] Appl. No.: 506,242

[30] Foreign Application Priority Data

Sept. 17, 1973 Canada .................................. 181229

[52] U.S. Cl. ..................................... 260/38; 260/838
[51] Int. Cl.$^2$ ................... C08L 61/10; C08L 61/18
[58] Field of Search ..................... 260/838, 38, 52

[56] References Cited

UNITED STATES PATENTS

| | | | |
|---|---|---|---|
| 3,316,140 | 4/1967 | Sonnabend | 260/61 X |
| 3,375,225 | 3/1968 | Keane et al. | 260/838 |
| 3,576,788 | 4/1971 | Harris et al. | 260/52 |
| 3,787,350 | 1/1974 | Harris et al. | 260/38 |
| 3,838,103 | 9/1974 | Edwards | 260/38 X |

FOREIGN PATENTS OR APPLICATIONS

| | | |
|---|---|---|
| 1,338,219 | 11/1973 | United Kingdom |
| 623,271 | 5/1949 | United Kingdom |
| 1,098,029 | 1/1968 | United Kingdom |
| 1,210,240 | 10/1970 | United Kingdom |

*Primary Examiner*—Lewis T. Jacobs
*Assistant Examiner*—S. M. Person
*Attorney, Agent, or Firm*—Flynn & Frishauf

[57] ABSTRACT

Compositions of at least 50% by weight of a resin having repeat units of formula

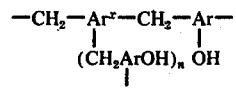

wherein $Ar^x$ is a divalent or trivalent aromatic hydrocarbyl group, optionally substituted, Ar is a phenol residue, and $n$ is 0 or 1 and up to 50% (based on the total weight of resins) of a phenol/aldehyde novolac or resole resin can be cured to form thermoset resins useful in mouldings, laminates, cements and coatings.

27 Claims, No Drawings

RESIN COMPOSITIONS

The present invention relates to resin compositions and the cured products obtainable therefrom.

British patent specification No. 1150203 describes the production of resins having repeating units of the formula

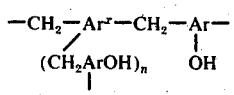

wherein $Ar^x$ is an aromatic hydrocarbon group, which optionally has inert substituents and Ar is the residue of a phenolic compound as hereinafter defined and $n$ is 0 or 1. Aralkylene/phenol resins of this type are sold by Albright and Wilson Limited under the registered Trade Mark "XYLOK".

These resins can be cured with hexamethylene tetramine to form a thermoset product and are used in the formation of moulded products and laminates, which are stable to temperatures up to 250° C. The usual curing temperature is 150° – 175° C and, if the product is to be used at a temperature above this, then post curing is desirable with the temperature being gradually raised to the temperature of use. Post curing can also be desirable for improving the properties of the product. However post curing is a slow process because the temperature must be raised slowly, if there is to be avoided the formation of blisters from release of volatile material e.g. ammonia in the cured product, the volatile material either resulting from the curing or as a by product of further reactions in the cured product.

We have now found that among other effects the post curing time for these resins can be reduced without significant effect on the thermal stability of the cured product by addition of up to 50% of a phenol/aldehyde resin.

The present invention provides a composition comprising, as resin component (a) at least 50%, preferably 70 – 90%, by weight, of a resin having repeating units of the formula

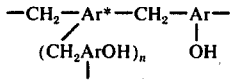

wherein Ar* is a divalent or trivalent aromatic hydrocarbyl group which optionally has inert substituents and Ar is the residue formed by removal of two nuclear hydrogen atoms from a phenolic compound with 1 – 3 hydroxyl groups and at least two nuclear hydrogen atoms and $n$ is 0 or 1, and as resin component (b) up to 50%, preferably 10 – 30%, by weight of an uncured resin formed by reaction of a phenolic compound and an aldehyde, usually formaldehyde.

The composition of the invention are mixed with a conventional curing agent for resin (a), and for resin (b) where necessary (in the case of novolac resins) or desired (in the case of resole resins) e.g. hexamethylene tetramine and then the mixture cured by heating usually at above 70° C and preferably over 100° C e.g. 130° – 250° C for a period of time such as 0.1 – 24 hrs.

For the production of moulded products and laminates, the heating e.g. at temperatures of 150° – 175° C is carried out with simultaneous application of pressures of e.g. 50 – 17,000 psi. Preferably for high temperature use the cured products are post cured at temperatures rising from the curing temperature up to e.g. 250° C without applied pressure though the latter may be used if desired. Need for post curing and the time required for it vary according to the desired properties of the product, and the temperature of use of that product, as well as the size and shape of the cured product, but times of the order of 1 – 40 hr, preferably 4 – 20 hr, e.g. 4 – 10 hr usually 6 hr have generally been found adequate. Under certain circumstances e.g. in the case of injection mouldings, it may be possible to dispense with the post curing operation and still obtain a cured product usable at 250° C without blistering.

The resin component (a) is preferably prepared as described in British Patent Specification No. 1150203 by reacting (1) an aralkyl ether of the general formula R' $(-CH_2OR)_a$ and/or aralkyl halide of the general formula R' $-(CH_2X)_a$, wherein R' is a divalent or trivalent aromatic hydrocarbyl radical, R' optionally containing inert substituents in the aromatic nucleus, R is an alkyl radical containing less than six carbon atoms, X is chlorine, bromine or iodine and $a$ has a value of 2 or 3, with a molar excess, normally of at least 1.3 : 1, preferably in the range of 1.4 : 1 to 2.5 : 1, of (2) a phenolic compound or a phenolic compound and a compound containing an aromatic nucleus. Thus Ar* is R'. If $a$ is 3, then $n$ is 1 and a further ArOH group may be bonded to Ar* through another methylene bridge.

In these general formulae Ar* and thus R' represent any divalent or trivalent aromatic hydrocarbyl radical, for example the m- or p-phenylene radical, the diphenylene radical, the 2,6-naphthylene, or 1,3,5-phenylene triradical.

Thus both mononuclear and fused and unfused poly nuclear radicals may be represented by Ar* and R' but mononuclear especially divalent mononuclear radicals are preferred because the cured products obtained from compounds in which Ar* is mononuclear have higher strength at high temperatures than those in which Ar* is a di or polynuclear radical. RO is preferably an alkoxy radical of less than 4 carbon atoms, e.g. a methoxy radical. The preferred compounds (1) for a reaction with the phenolic compounds are those in which $a$ has a value 2, particularly the p-xylylene dihalides, for example p-xylylene dichloride, and the p-xylylene dialkyl ethers for example p-xylylene glycoldimethylether.

If desired the R' radicals may contain substituents, for example methyl radicals, attached to the aromatic nucleus, provided the said substituents are inert under the conditions of the reaction. In fact the presence of chlorine or fluorine atoms in some or all of the available positions in the aromatic nucleus has been found advantageous in that it leads to improved flame resistance in the resulting polymeric products. Examples of such substituted aralkyl ethers and aralkyl halides, which may be employed according to this invention, are 2,3,5,6-tetrachloro-1,4-di(chloromethyl)benzene and 2,3,5,6-tetrachloro-1,4-di(methoxy-methyl)benzene.

The term "phenolic compound" as employed herein includes any compound or mixture of compounds derived from benzene and containing 1 to 3 preferably 1 or 2, hydroxyl radicals joined to the aromatic nucleus there being a total of not more than 3 substituents attached to ring carbon atoms of the benzene nucleus apart from the one essential hydroxyl group. Thus the phenolic compounds may be of formula

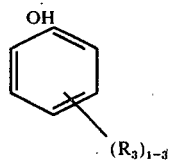

where each $R_3$ is hydrogen, hydroxyl, alkyl of 1 to 8 carbon atoms e.g. methyl, ethyl, isopropyl, tert. butyl or tert. octyl, phenyl, and hydroxyphenyl alkyl e.g. hydroxy phenyl-methylene, -ethylene and -isopropylidene. Examples of these phenolic compounds are phenol, p-cresol, m-cresol, resorcinol, catechol, 4-methyl catechol, isopropyl catechol, diphenylol propane (bis 2,2- (4-hydroxy phenyl)propane diphenylolethane, monoalkyl phenols such as p-ethylphenol, p-tert. butyl phenol and p-tert. octyl phenol, m- p-phenyl phenol, pyrogallol and phloroglucinol. Mixtures of phenols can be used such as mixtures of mono- and diphenols e.g. phenol and resorcinol or mixtures of diphenols e.g. 4-methyl catechol and catechol and/or resorcinol. The phenolic compound which is used to form the resin component (a) may be different from that used to form the resin component (b) but is preferably the same.

Examples of the compound containing aromatic nuclei which may be mixed with the phenolic compound in the formation of resin component (a) are diphenyl- or dibenzyl-ether, terphenyl, diphenylamine, diphenyl sulphide, diphenyl, anthracene, diphenylsulphone, triphenyl phosphate, octaphenylcyclotetrasiloxane, aryl substituted borazoles and metal complexes such as ferrocene. The proportion of aromatic compound can vary within wide limits but is not sufficient to prevent satisfactory curing of the reaction product with the hardening agent e.g. hexamethylene tetramine. Further details of the aromatic compound and its mode of use in the reaction of phenol and dihalide or diether are given in British patent specification No. 1150203.

The phenol/aldehyde resin used as component (b) is usually present in the compositions of the invention in an amount of 1 – 50% preferably 10 – 50%, e.g. 10 – 40 and especially 10 – 30%. It is a novolac or resole resin. Such resins are well known and are prepared by reacting the phenolic compound with an aldehyde, usually formaldehyde in the presence of an acidic or basic catalyst respectively. Examples of the basic and acidic catalysts are ammonia (or sodium hydroxide) and oxalic acid respectively. For novolac resins, a phenol to aldehyde molar ratio of 1.3 : 1 to 1.05 : 1 is usually used, preferably 1.25 : 1 to 1.05 : 1, especially about 1.25 : 1, while for resoles, a phenol to aldehyde molar ratio of 0.75 : 1 to 0.95 : 1 is suitable, especially about 0.8 : 1. Phenol/aldehyde resins and their preparation are described in "Phenolic Resins" by Whitehouse, Pritchett and Barnett published in 1967 by Iliffe Books Ltd (2nd Revised Edition). The phenol aldehyde novolac resins also include those resins rich in 2,2' isomer, known as "high-ortho" resins which are mentioned in the above book and are also described by Fraser, Hall and Raum, J. Appl. Chem 7,676, (1957): the catalyst used to form such high-ortho resins may be any one of those described for that purpose, though zinc hydroxide and acetate may be particularly mentioned. Mixtures of novolac and resole resins in a proportion of 1 : 99 to 99 : 1 preferably 1 : 3 to 3 : 1 can also be used as component (b).

As mentioned above, the compositions of the invention can be cured with conventional phenolic resin curing agents, especially hexamethylene tetramine. Amounts of the latter of 5 – 20% by weight based on the total weight of resin components (a) and (b) have been found to be advantageous and when resin (b) is a novolac resin with preferred amounts of 8 – 16% e.g. 10 – 15% such as about 12.5% based on the total weight of resin component (a) and novolac resin. When resin (b) is a resole resin the latter can act as sole curing agent for resin component (a) without the need for added hexamethylene tetramine or other curing agent. However it is advantageous to have hexamethylene tetramine present as well because the cure time is reduced further and there are processing advantages in that blistering during post cure can be reduced. The amount of hexamethylene tetramine for curing mixtures of resin (a) and resole resin component (b) can be 0.1 – 20% e.g. 3 – 20% especially 5 – 15% based on the total weight of resin component (a) and resole resin or 8 – 16% e.g. 10 – 15% such as about 12.5% based on the weight of resin component (a) above.

The resin components (a) and (b) and the curing agent (if present) can be mixed in any order, but it is convenient to mix components (a) and (b) first and then add the curing agent (if present) together with any other additives (if present). The mixing can be carried out in any convenient method such as dry blending to form a powder for use in moulding (or with subsequent addition of organic solvent for use as a coating liquid) or blending in solutions in an organic solvent e.g. methyl isobutyl ketone or methyl ethyl ketone, methylisoamyl ketone, isophorone, diacetone alcohol, cyclohexanone, Cellosolves such as 2-ethoxyethanol, Cellosolve ethers e.g. the methylether or Cellosolve esters e.g., the acetate, any of which solvents can be mixed with an aromatic hydrocarbon such as benzene, toluene or xylene or a hydrocarbon such as white spirit or solvent naphtha or an alcohol e.g. of 1 to 6 carbon atoms, such as methanol, ethanol or n-butanol. The resin is usually present in the organic solvent solutions in an amount of 5 – 90% preferably 20 – 50% by weight. The resin solution can be used as a coating composition for use e.g. as a lamp capping cement or for production of an impregnating solution for laminates. The mixing can be carried out at a low temperature e.g. 20° – 30° C and the mixture stored until required, but the mixing of the curing agent with the remainder of the components can be carried out at a high temperature e.g. at 120° C so long as the mixture is used soon afterwards or so long as it is stored at room temperature after mixing.

The other ingredients, which may be present in admixture with the resin components and curing agent include inorganic fillers, eg. asbestos flour, graphite, mica, chopped glass strands or silica (for use in moulding powders) or asbestos or glass fabrics or glass mats (for use with laminates). The inorganic filler and resin mixture will normally be present in a weight ratio of 0.3 : 1 to 5.0 : 1. Other ingredients such as pigments and lubricants e.g. graphite, calcium stearate, or molybdenum disulphide, accelerators, antistaining agents and stabilisers, e.g. salicylic acid and magnesium oxide may also be present if desired. In particular the moulding powders comprising the resins and silica or asbestos filler can be made into highly satisfactory moulded friction linings, e.g. brake pads. In the case of laminates, the solution of resin components (a) and (b) and curing agent can be used to impregnate the fabrics or mats to form prepregs optionally after partial curing; then a stack of prepregs is cured.

The cured products from the resin component (a) have as mentioned above a high heat stability but require a long post-cure to give maximum results. The cured products from resin component (b), the phenol-/aldehyde resins alone, have rather poor heat stability though need much shorter post-cure for maximum results. The mixtures of at least 50% of resin component (a) and up to 50% of resin component (b) give cured products having the advantage of high heat stability of the resin component (a) with the shorter post-cure of resin component (b). Amounts of 20 – 30% resin component (b) e.g. about 25% and 70 – 80% of resin component (a) e.g. about 75% give the best balance of reduced post cure time and high temperature strength of the cured product. When the resin component (b) is a resole resin, a reduced cure time for the composition over that from resin component (a) can also be achieved.

The invention is illustrated in the following Examples, in which comp. denotes a comparative Example and hexamine denotes hexamethyl tetramine.

RESIN PREPARATIONS

Resin A

Phenol-formaldehyde Resin (Ammonia Catalysed Resole Resin)

250 gms. (2.66 moles) of phenol and 250 gms (3.33 moles) of 40% formalin were mixed together in a flask and 25 mls. of 0.880 ammonia were added carefully with stirring. The mixture was heated slowly to reflux and then refluxed for ten minutes after it had become cloudy. The resultant liquor was distilled under a vacuum of approx. 25mm of mercury at a temperature of about 80° C until a sample removed from the flask gave a brittle bead on cooling. The product was then poured into a tray and allowed to cool.

Resin B

Phenol-formaldehyde Resin (Oxalic Acid Catalysed Novolac Resin)

752 gms. (8 moles) of phenol, 480 gms (6.4 moles) of 40% formalin and 11.25 gms of oxalic acid were mixed together in a flask and cautiously heated to reflux. After refluxing for two hours, the product was vacuum distilled until a withdrawn sample gave a brittle bead on cooling. The resin was then poured into a tray to cool. The product was a colourless solid having a softening point of 57° C.

Resin C

Aralkylene phenol Resin 705 gms (7.5 moles) of phenol and 830 gms (5 moles) of technical grade of p-xylylene dimethyl ether were mixed together in a flask. Diethyl sulphate (1 ml) was added and the mixture was heated to reflux with stirring. After the initial exothermic reaction had subsided, the methanol formed by the reaction and also the excess of phenol were removed by distillation over the temperature range 130° – 200° C. When distilled had ceased the product was cooled to 160° C and then poured into a tray for solidification. The resultant resin was a red-brown solid having a softening point of 97° C.

Resin D 564 gms. (6 moles) of phenol and 592 gms (7.5 moles) of 38% formaldehyde solution were mixed together and 33.75 mls of a 33.3% sodium hydroxide solution were added. The resultant mixture was then heated to reflux at about 100° C. After 10 minutes of reflux the solution was distilled under a vacuum of about 1 mm until the reaction temperature reached 80° C. The product was then cooled to give a clear brown liquid, which is a resole resin.

Resin E 752 gms (8 moles) of phenol and 480 mls (6 moles) of a 38% formaldehyde solution was mixed together in a flask and 7.5 gms of zinc acetate was added. The mixture was refluxed for two hours at about 100° C and then distilled under a vacuum of about 1mm.Hg. until a sample removed from the reaction was brittle. On cooling a light brown solid was obtained having a softening point of 69° C. This solid is a high ortho novolac resin.

EXAMPLES 1 AND 2

The following moulding compositions were made by thoroughly mixing the ingredients and then processing them on a two roll mill for 10 minutes with one roll at 120° C and the other water cooled.

| Example<br>Moulding Composition | Comp.<br>1 | 1<br>2 | 2<br>3 |
|---|---|---|---|
| Resin A (resin component (b)) | — | — | 40g |
| Resin B (resin component (b)) | — | 40g | — |
| Resin C (resin component (a)) | 160g | 120g | 120g |
| Asbestos flour | 340g | 340g | 340g |
| Hexamine | 20g | 20g | 15g |
| Calcium stearate | 8g | 8g | 8g |
| Magnesium oxide | 5g | 5g | 5g |
| Zinc borate | 8g | 8g | 8g |

Tests on Moulding Compositions a. Minimum Cure time

This is the minimum time required to produce a cup according to BS2782 Method 105B, which is free of blisters on the inside base.

Moulding composition 1, time 75 secs
Moulding composition 2, time 75 secs
Moulding composition 3, time 60 secs The presence of resole in composition 3 reduces the minimum cure time.

b. Minimum Post-Cure Time

Cups were moulded from the compositions for 10 minutes at 165° C and 1,000 psi and were then post-cured from 140° – 250° C by carefully raising the temperature at a slow rate over many hours. The minimum post-cure time is that which the cups can survive without blistering.

Moulding composition 1, time 20 hours
Moulding Composition 2, time 6 hours
Moulding Composition 3, time 6 hours The moulding composition 2 derived from the mixture of resin components (a) and (b) has a greatly reduced post-cure time over that from resin component (a) alone.

EXAMPLES 3 AND 4

The following moulding compositions were prepared by thoroughly mixing the ingredients in the amounts given below which are parts by weight and processing them on a two roll mill for 10 minutes with one roll at 120° C and the other water cooled.

| Example Composition | Comp. 4 | Comp. 5 | 3 6 | 4 7 | Comp. 8 |
|---|---|---|---|---|---|
| Resin B | 160 | 120 | 80 | 40 | — |
| Resin C | — | 40 | 80 | 120 | 160 |
| Asbestos flour | 340 | 340 | 340 | 340 | 340 |
| Hexamine | 20 | 20 | 20 | 20 | 20 |
| Calcium stearate | 8 | 8 | 8 | 8 | 8 |
| Magnesium oxide | 5 | 5 | 5 | 5 | 5 |
| Salicyclic acid | 6 | 6 | 6 | 6 | 6 |

Using each of these moulding compositions flexural strength bars were made by pressing at 160° C and 1000 psi for 15 minutes. The bars were then postcured from 140° to 250° C over a period of 20 hours. Flexural strength measurements were made at 25° and 250° C and several other samples were placed in an oven at 250° C. The time taken for the strengths of these samples to fall to 50% of the initial value was determined by carrying out measurements on the samples at various time intervals. the results obtained were as follows.

| Composition | 4 | 5 | 6 | 7 | 8 |
|---|---|---|---|---|---|
| Initial strength at 25° C in psi | 9800 | 9300 | 9500 | 9500 | 9400 |
| Initial strength at 250° C in psi | 8000 | 7500 | 7400 | 7700 | 7400 |
| Half life at 250° C as defined above | 100–150 hrs | 250 hrs | 500 hrs | 750 hrs | 800 hrs |

These results show that additions of up to 50% of novolac resin to the aralkylene phenol resin does not have a significant effect on the half life of 250° C and that addition of up to 25% of novolac resin has a negligible effect on the half life at 250° C.

EXAMPLES 5 AND 7

Moulding compositions having the components in the amounts given below in parts by weight were prepared by dissolving the resins in ethyl methyl ketone and the hexamine in methanol and dispersing the remaining solid materials in these solutions. After removal of the solvent the compounds were heated in an oven for 10 minutes at 130° C. After granulating the product, flexural bars were moulded at 160° C for 15 minutes and the postcured from 140° to 250° C over 20 hours.

| Example Composition | Comp. 9 | Comp. 10 | Comp. 11 | 5 12 | 6 13 |
|---|---|---|---|---|---|
| Resin A | 160 | — | — | 80 | — |
| Resin D | — | 160 | — | — | 80 |
| Resin analoguous to Resin C of softening point 94° C prepared as described in BP1150203 from p-xylylene dimethyl ether (tech) and phenol | — | — | 160 | 80 | 80 |
| Hexamine | — | — | 20 | 10 | 10 |
| Asbestos flour | 340 | 340 | 340 | 340 | 340 |
| Calcium stearate | 8 | 8 | 8 | 8 | 8 |
| Magnesium oxide | 5 | 5 | 5 | 5 | 5 |

The following results were then obtained for flexural strengths of the bars and their 250° C half life as defined previously.

| Composition | 9 | 10 | 11 | 12 | 13 |
|---|---|---|---|---|---|
| Initial strength at 25° C in psi | 7800 | 7000 | 9400 | 8500 | 7700 |
| Initial strength at 250° C in psi | 7000 | 6600 | 7400 | 7000 | 7000 |
| Half life at 250° C | 100–150 hrs | 100–150 hrs | 800 hrs | 500 hrs | 500 hrs |

These results show that resole resins are analoguous to novolac resins in Examples 3 and 4 in their effect on high temperature half lives on the cured products.

EXAMPLES 7 – 10

The following solutions were prepared with the amounts given in parts by weight

| Examples Composition | 7 14 | 8 15 | Comp. 16 | 9 17 | 10 18 |
|---|---|---|---|---|---|
| Resin A | 100 | — | — | 100 | — |
| Resin D | — | 100 | — | — | 100 |
| Resin as used in Example 5–6 | 300 | 300 | 100 | 300 | 300 |
| Hexamine | 37.5 | 37.5 | 12.5 | — | — |
| Methylethylketone | 327 | 327 | 100 | 327 | 327 |

These solutions were used to impregnate Margloss 7T/P734 glasscloth with a precure of 10 minutes at 125° C for compositions 14, 15, 17 and 18 and 10 minutes at 135° C for composition 16. Laminates were prepared by pressing layers of the impregnated material at 1000 psi and 175° C for one hour. The laminates were then postcured from 175° to 250° C over a period of 24 hours.

The following flexural strength measurements were then made.

| Composition | 14 | 15 | 16 | 17 | 18 |
|---|---|---|---|---|---|
| Flexural strength at 25° C in psi | 46800 | 36100 | 71000 | 38300 | 31000 |
| Flexural strength at 250° C in psi | 33200 | 36700 | 41200 | 29200 | 27400 |
| Resin Content of laminate | 34.8% | 34.9% | 34.5% | 34.1% | 33.8% |

EXAMPLES 11 AND 12

In Compositions 4 – 8 (described above in Examples 3 and 4) the novolac Resin B was replaced by the high ortho novolac Resin E giving compositions 19 – 23, containing respectively 100%, 75%, 50%, 25% and 0% of Resin E (based on the weight of Resin C and E), of which compositions 21 and 22 containing 50% and 25% of Resin E (based on the weight of Resin C and E) illustrate the invention and are Examples 11 and 12. Moulding bars were made from the compositions and tested in the same was as for Examples 3 and 4. The results were as follows.

| Composition | 19 | 20 | 21 | 22 | 23 |
|---|---|---|---|---|---|
| Initial Strength at 25° C in psi | 9900 | 9500 | 9700 | 9800 | 9500 |
| Initial Strength at 250° C in psi | 8200 | 7800 | 7500 | 7600 | 7500 |
| Half life at 250° C as defined prevously hours. | 100–150 | 250 | 500 | 750 | 800 |

EXAMPLES 13 – 15

In moulding composition 2 (described above in relation to Examples 1 and 2) the portion of resin B to Resin C was varied, the amounts of the remaining components being the same as in composition 2. The resin contents of the compositions were as follows.

| Example Composition | 13 24 | 14 25 | 15 26 |
|---|---|---|---|
| Resin B | 16g | 32g | 48g |
| Resin C | 144g | 128g | 112g |

The compositions were moulded into cups and the minimum post cure time determined, as described with respect to Examples 1 and 2. The results were as follows.

| Example Composition | 13 24 | 14 25 | 15 26 |
|---|---|---|---|
| Minimum post cure time hrs. | 16 | 10 | 6 |

We claim:
1. A composition comprising at least 50% by weight (based on the total weight of resin components (a) and (b)) of resin component (a), a resin haing repeating units of the formula

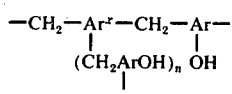

wherein $Ar^x$ is a divalent or trivalent aromatic hydrocarbyl radical selected from the group consisting of aromatic hydrocarbyl groups and aromatic hydrocarbyl groups having at least one substituent selected from the groups consisting of chlorine and fluorine atoms and methyl groups, and Ar is the residue formed by removal of two nuclear hydrogen atoms from a phenolic compound with 1 – 3 hydroxyl groups and at least two nuclear hydrogen atoms and $n$ is 0 or 1, and 1 to 50% by weight (based on the total weight of resin components (a) and (b)) of resin component (b), a resin formed by reaction of a phenolic compound and an aldehyde and selected from the group consisting of novolac resins and resole resins.

2. A composition according to claim 1 comprising 70 – 90% by weight of resin component (a) and 30 – 10% by weight of resin component (b).

3. A composition according to claim 2 comprising about 75% by weight of resin component (a) and about 25% by weight of resin component (b).

4. A composition according to claim 1 wherein the resin component (b) is a novolac resin.

5. A composition according to claim 4 which also comprises 8 – 20% by weight of hexamethylene tetramine (based on the total weight of resin component (a) and novolac resin).

6. A composition according to claim 1 wherein the resin component (b) is a resole resin.

7. A composition according to claim 6 which also comprises 8 – 20% by weight of hexamethylene tetramine based on the weight of resin component (a).

8. A composition according to claim 5 wherein the novolac resin is formed by reacting phenol and formaldehyde in a molar ratio of 1.25 : 1 to 1.05 : 1.

9. A composition according to claim 6 wherein the resole resin is formed by reacting phenol and formaldehyde in the molar ratio of 0.75 : 1 to 0.95 : 1 in the presence of a basic catalyst.

10. A composition according to claim 7 wherein the resole resin is formed by reacting phenol and formaldehyde in the molar ratio of 0.75 : 1 to 0.95 : 1 in the presence of a basic catalyst.

11. A composition according to claim 1 wherein resin component (a) is prepared by reacting an aralkylene halide or ether of formula $Ar^x(CH_2X)_a$ wherein $Ar^x$ is a divalent or trivalent aromatic hydrocarbyl group, $a$ is 2 or 3 and X represents a chlorine, bromine or iodine atom or an alkoxy group of formula OR, in which R is an alkyl group of 1 to 5 carbon atoms, with the phenolic compound in an amount of at least 1.3 mole phenolic compound per mole of halide or ether.

12. A composition according to claim 11 wherein resin component (a) is prepared by reacting the aralkylene ether with the phenol.

13. A composition according to claim 11 wherein $Ar^x$ represents a mononuclear aromatic group.

14. A composition according to claim 12 wherein the aralkylene either is a xylylene dimethyl ether.

15. A composition according to claim 11 wherein the phenolic compound used to form resin component (a) is selected from the group consisting of phenol, resorcinol, catechol and 4-methyl catechol and mixtures thereof.

16. A composition according to claim 1 which also comprises an organic solvent for the resin components (a) and (b).

17. A composition according to claim 1 which also comprises an inorganic filler.

18. A composition according to claim 17 wherein the filler is at least one of asbestos flour, graphite, mica, chopped glass strands, silica, asbestos and glass fabrics and glass mats.

19. A composition according to claim 1 wherein $Ar^x$ represents an aromatic hydrocarbyl group.

20. A cured product obtained by curing a composition as claimed in claim 1 with 5 – 20% by weight (based on the weight of resin components (a) and (b)) of hexamethylene tetramine.

21. A cured product obtained by heating a composition as claimed in claim 1 in which resin component (b) is a phenol/aldehyde resole resin.

22. A composition according to claim 5 which comprises 10 – 40% (based on the total resin weight) of a novolac resin from formaldehyde and a phenol, 90 – 60% (based on the total resin weight) of an aralkylene-phenol resin made by reacting an aralkylene ether or halide of formula $Ar^x(CH_2X)_a$ where X represents a chlorine, bromine or iodine atom or an alkoxy group of formula OR, in which R is an alkyl group of 1 to 5 carbon atoms, $Ar^x$ is a mononuclear aromatic hydrocarbyl radical and $a$ is 2 or 3, with 1.4 to 2.5 moles (per mole of ether or halide) of the phenolic compound of formula ArOH, and 8 – 20% of hexamethylene tetramine (based on the total resin weight).

23. A composition according to claim 7 which comprises 10 – 40% (based on the total resin weight) of a resole resin from formaldehyde and a phenol, 90 – 60% (based on the total resin weight) of an aralkylene phenol resin made by reacting an aralkylene ether or halide of formula $Ar^x(CH_2X)_a$ where X represents a chlorine, bromine or iodine atom or an alkoxy group of formula OR, in which R is an alkyl group of 1 to 5 carbon atoms, $Ar^x$ is a mononuclear aromatic hydrocarbyl radical and $a$ is 2 or 3, with 1.4 to 2.5 moles (per mole of ether or halide) of the phenolic compound of formula ArOH, and 8 – 20% of hexamethylene tetramine (based on the weight of said aralkylene-phenol resin).

24. A composition according to claim 22 which comprises 10 – 30% of said novolac resin and 90 – 70% of said aralkylene-phenol resin.

25. A composition according to claim 23 which comprises 10 – 30% of said resole resin and 90 – 70% of said aralkylenephenol resin.

26. A composition according to claim 24 which comprises 20 – 30% (based on the total resin weight) of a phenol-X formaldehyde novolac resin, 80 – 70% (based on the total resin weight) of a resin obtained by reacting a xylylene glycol dimethyl ether with 1,4 – 2.5 moles (per mole of ether) of a phenol which is selected from the group consisting of phenol, resorcinol, catechol and 4-methyl catechol, and 10 – 15% of hexamethylene tetramine (based on the total resin weight).

27. A composition according to claim 25 which comprises 20 – 30% (based on the total resin weight) of a phenol-X formaldehyde resole resin, 80 – 70% (based on the total resin weight) of an aralkylene-X-phenol resin obtained by reacting a xylylene glycol dimethyl ether with 1.4 – 2.5 moles (per mole of ether) of a phenol selected from the group consisting of phenol, resorcinol, catechol and 4-methyl catechol and 10 – 15% of hexamethylene tetramine (based on the weight of said aralkylene/phenol resin).

* * * * *